United States Patent
Yamada

(10) Patent No.: US 9,910,757 B2
(45) Date of Patent: Mar. 6, 2018

(54) SEMICONDUCTOR DEVICE, LOG ACQUISITION METHOD AND ELECTRONIC APPARATUS

(71) Applicant: Naoyuki Yamada, Kanagawa (JP)

(72) Inventor: Naoyuki Yamada, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 59 days.

(21) Appl. No.: 14/995,686

(22) Filed: Jan. 14, 2016

(65) Prior Publication Data

US 2016/0216914 A1    Jul. 28, 2016

(30) Foreign Application Priority Data

Jan. 23, 2015    (JP) .................................. 2015-010802

(51) Int. Cl.
*G06F 12/00* (2006.01)
*G06F 11/34* (2006.01)
*G06F 21/79* (2013.01)

(52) U.S. Cl.
CPC ...... *G06F 11/3471* (2013.01); *G06F 11/3466* (2013.01); *G06F 11/3476* (2013.01); *G06F 21/79* (2013.01); *G06F 2201/86* (2013.01)

(58) Field of Classification Search
None
See application file for complete search history.

(56) References Cited

U.S. PATENT DOCUMENTS

2016/0216914 A1* 7/2016 Yamada .............. G06F 11/3476

FOREIGN PATENT DOCUMENTS

| JP | 2008-287319 | 11/2008 |
|---|---|---|
| JP | 2013-225291 | 10/2013 |
| JP | 2015-005124 | 1/2015 |

* cited by examiner

*Primary Examiner* — Brian R Peugh
(74) *Attorney, Agent, or Firm* — Oblon, McClelland, Maier & Neustadt, L.L.P.

(57) ABSTRACT

A semiconductor device includes a CPU access detection unit configured to detect a predetermined access among accesses from a CPU to the semiconductor device, based on an access detection condition; an internal signal detection unit configured to detect a predetermined internal signal among internal signals from a function module in the semiconductor device, based on an event detection condition, the predetermined access and the predetermined internal signal being subjects for the log acquisition; an internal memory unit configured to store at least one of log data for the predetermined access detected by the CPU access detection unit and log data for the predetermined internal signal detected by the internal signal detection unit; a setting input unit configured to receive an input of setting data; and a detection condition setting unit configured to set the access detection condition and the event detection condition based on the setting data.

10 Claims, 7 Drawing Sheets

SEMICONDUCTOR DEVICE, LOG ACQUISITION METHOD AND ELECTRONIC APPARATUS

CROSS-REFERENCE TO RELATED APPLICATIONS

The present application claims the benefit of priority under 35 U.S.C. § 119 of Japanese Patent Application No. 2015-010802, filed Jan. 23, 2015, the contents of which are incorporated herein by reference in their entirety.

BACKGROUND OF THE INVENTION

1. Field of the Invention

The disclosures herein generally relate to a semiconductor device, a log acquisition method and an electronic apparatus.

2. Description of the Related Art

There is known to output a history (log) regarding an access of a CPU or an internal signal of a semiconductor device, in order to analyze a failure in the semiconductor device which is accessible from the CPU and in an electronic apparatus containing the semiconductor device, to a serial communication means installed in a memory or the semiconductor device under a predetermined condition.

For example, Japanese Unexamined Patent Application Publication No. 2013-225291 discloses an electronic apparatus which generates log data for debugging, and accumulates the generated log data in a buffer or forwards the log data to a controller, according to an empty state of the buffer inside an engine control unit and a data transfer state of the controller.

Japanese Unexamined Patent Application Publication No. 2008-287319 discloses monitoring an access from a CPU, determining whether log data are necessary based on a type of the access from the CPU in a semiconductor device for acquiring the log data, and acquiring only necessary log data.

SUMMARY OF THE INVENTION

It is a general object of at least one embodiment of the present invention to provide a semiconductor device, a log acquisition method and an electronic apparatus that substantially obviate one or more problems caused by the limitations and disadvantages of the related art.

In one embodiment, a semiconductor device includes a CPU (central processing unit) access detection unit configured to detect a predetermined access among accesses from a CPU to the semiconductor device, based on an access detection condition, the predetermined access being a subject for log acquisition; an internal signal detection unit configured to detect a predetermined internal signal among internal signals from a function module in the semiconductor device, based on an event detection condition, the predetermined internal signal being a subject for the log acquisition; an internal memory unit configured to store at least one of log data for the predetermined access detected by the CPU access detection unit and log data for the predetermined internal signal detected by the internal signal detection unit; a setting input unit configured to receive an input of setting data; and a detection condition setting unit configured to set the access detection condition and the event detection condition based on the setting data.

In another embodiment, a log acquisition method for acquiring log data of a semiconductor device including an internal memory unit, includes detecting a predetermined access among accesses from a CPU to the semiconductor device, based on an access detection condition, the predetermined access being a subject for log acquisition; detecting a predetermined internal signal among internal signals from a function module in the semiconductor device, based on an event detection condition, the predetermined internal signal being a subject for the log acquisition; receiving an input of setting data; setting the access detection condition and the event detection condition, based on the setting data; determining whether to permit the log acquisition based on the setting data; and storing at least one of log data for the predetermined access and log data for the predetermined internal signal in the internal memory unit, an access to the internal memory unit being controlled according to whether the log acquisition is permitted.

In yet another embodiment, an electronic apparatus includes a semiconductor device; and an external memory to which log data stored in an internal memory unit in the semiconductor device are forwarded. The semiconductor device includes a CPU access detection unit configured to detect a predetermined access among accesses from a CPU to the semiconductor device, based on an access detection condition, the predetermined access being a subject for log acquisition; an internal signal detection unit configured to detect a predetermined internal signal among internal signals from a function module in the semiconductor device, based on an event detection condition, the predetermined internal signal being a subject for the log acquisition; the internal memory unit configured to store at least one of log data for the predetermined access detected by the CPU access detection unit and log data for the predetermined internal signal detected by the internal signal detection unit; a setting input unit configured to receive an input of setting data; and a detection condition setting unit configured to set the access detection condition and the event detection condition based on the setting data.

BRIEF DESCRIPTION OF THE DRAWINGS

Other objects and further features of embodiments will become apparent from the following detailed description when read in conjunction with the accompanying drawings, in which.

DESCRIPTION OF THE PREFERRED EMBODIMENTS

Figure 1:
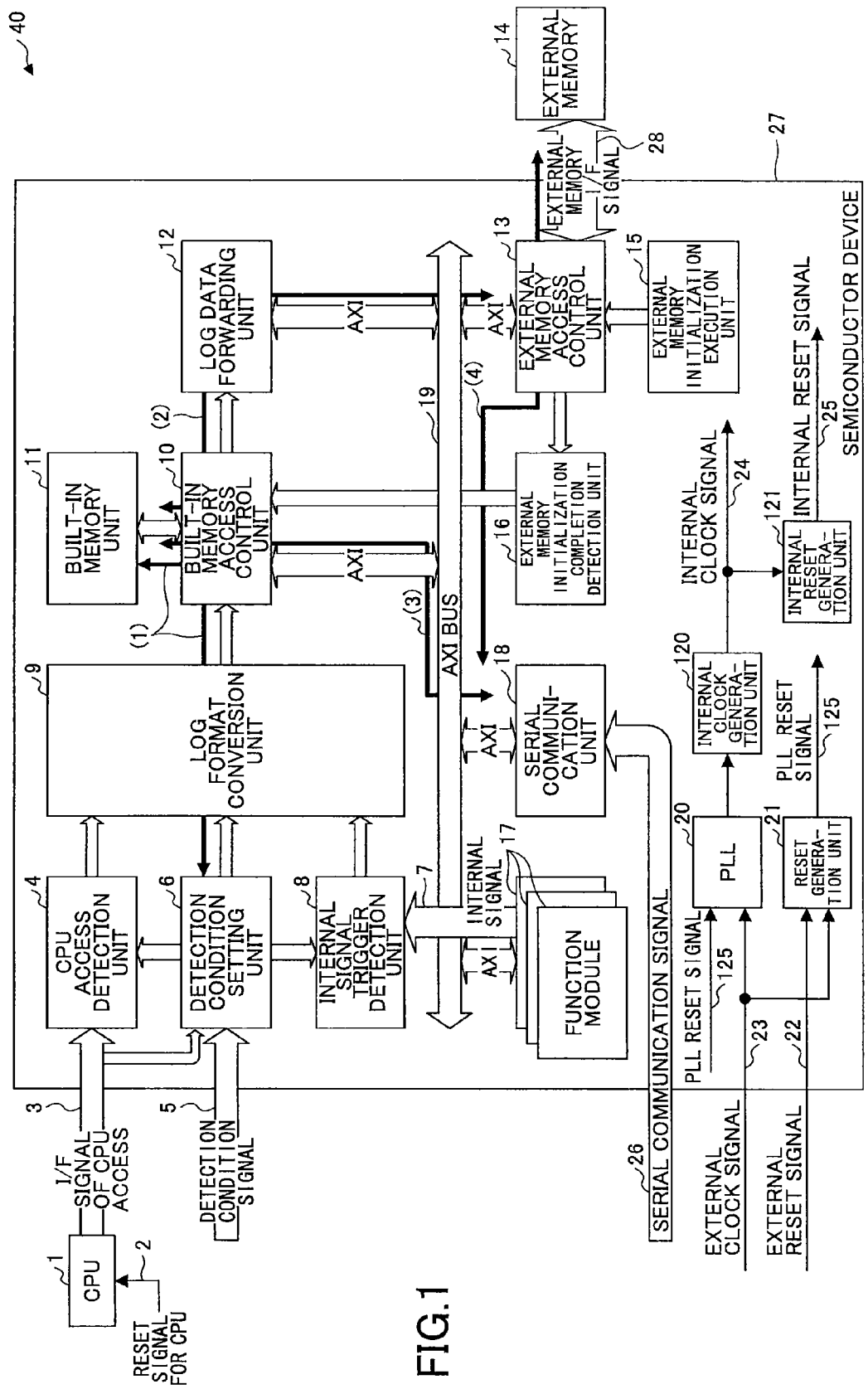
FIG. 1 is a diagram illustrating an example of an internal configuration of a semiconductor device according to a present embodiment.

In the following, embodiments of the present invention will be described with reference to the accompanying drawings.

Meanwhile, in the specification and the respective drawings, the same reference numeral is assigned to components having essentially the same function, and thereby their duplicate explanation may be omitted.

[Internal Configuration of Semiconductor Device]

At first, an internal configuration of a semiconductor device 27 according to an embodiment of the present invention will be described with reference to FIG. 1. FIG. 1 is a diagram illustrating an example of the internal configuration of the semiconductor device 27 according to the present embodiment. The semiconductor device 27 is a device that can be accessed by a CPU 1 for controlling the semiconductor device 27. The semiconductor device 27 and an external memory, which will be described later, are mounted on an electronic apparatus 40.

The semiconductor device 27 includes a CPU access detection unit 4, a detection condition setting unit 6, an internal signal trigger detection unit 8, a log format conversion unit 9, a built-in memory access control unit 10, a built-in memory unit 11, a log data forwarding unit 12, an external memory access control unit 13, an external memory initialization execution unit 15, an external memory initialization completion detection unit 16, a function module 17, a serial communication unit 18, an AXI (Advanced eXtensible Interface) bus 19, which is an example of an internal bus, a PLL (Phase Locked Loop) 20 and a reset generation unit 21.

The CPU 1 is a CPU for controlling the semiconductor device 27 according to the present embodiment. In a case where the CPU 1 accesses the semiconductor device 27, a CPU access I/F (Interface) signal 3 is output. In a case where a reset signal 2 is input to the CPU 1, the CPU 1 is reset.

The CPU access detection unit 4 detects the CPU access I/F signal 3. The CPU access detection unit 4 monitors an operation of performing an R/W (Read/Write) access to a certain address by the CPU access I/F signal 3, and detects an access from the CPU 1, which matches an access detection condition set by the detection condition setting unit 6 (in the following, referred to as "CPU access"). The detected CPU access is an example of log data, which are subjects for log acquisition.

The detection condition setting unit 6 sets an access detection condition, an event detection condition and permission or non-permission of log acquisition. A status of an external terminal of the semiconductor device 27 is a level of an external pin of the semiconductor device 27, and is indicated by a detection condition signal 5. The detection condition setting unit 6 latches the detection condition signal 5 at a timing of a rise of an external reset signal 22, and saves it. An access detection condition (or a mode thereof) is set by a certain external pin, and an event detection condition (or a mode thereof) is set by another external pin. The detection condition setting unit 6 may increase options of the respective detection conditions by using a plurality of the external pins of the semiconductor device 27.

The external terminal is an example of a setting input unit, and the status of the external terminal of the semiconductor device is an example of setting data.

The internal signal trigger detection unit 8 detects, based on the event detection condition set by the detection condition setting unit 6, an internal signal 7 (I/F signal), which satisfies the event detection condition, among internal signals 7 from the function module 17 included in the semiconductor device 27. Specifically, the internal signal trigger detection unit 8 inputs the internal signals 7 of the function module 17. The internal signal trigger detection unit 8 detects an internal signal 7, in which a combination of an interruption, a bus, a level or an edge of a control signal or the like, which matches the event detection condition, is set in advance. The detected internal signal 7 is an example of log data which are subjects for log acquisition.

Figure 3:
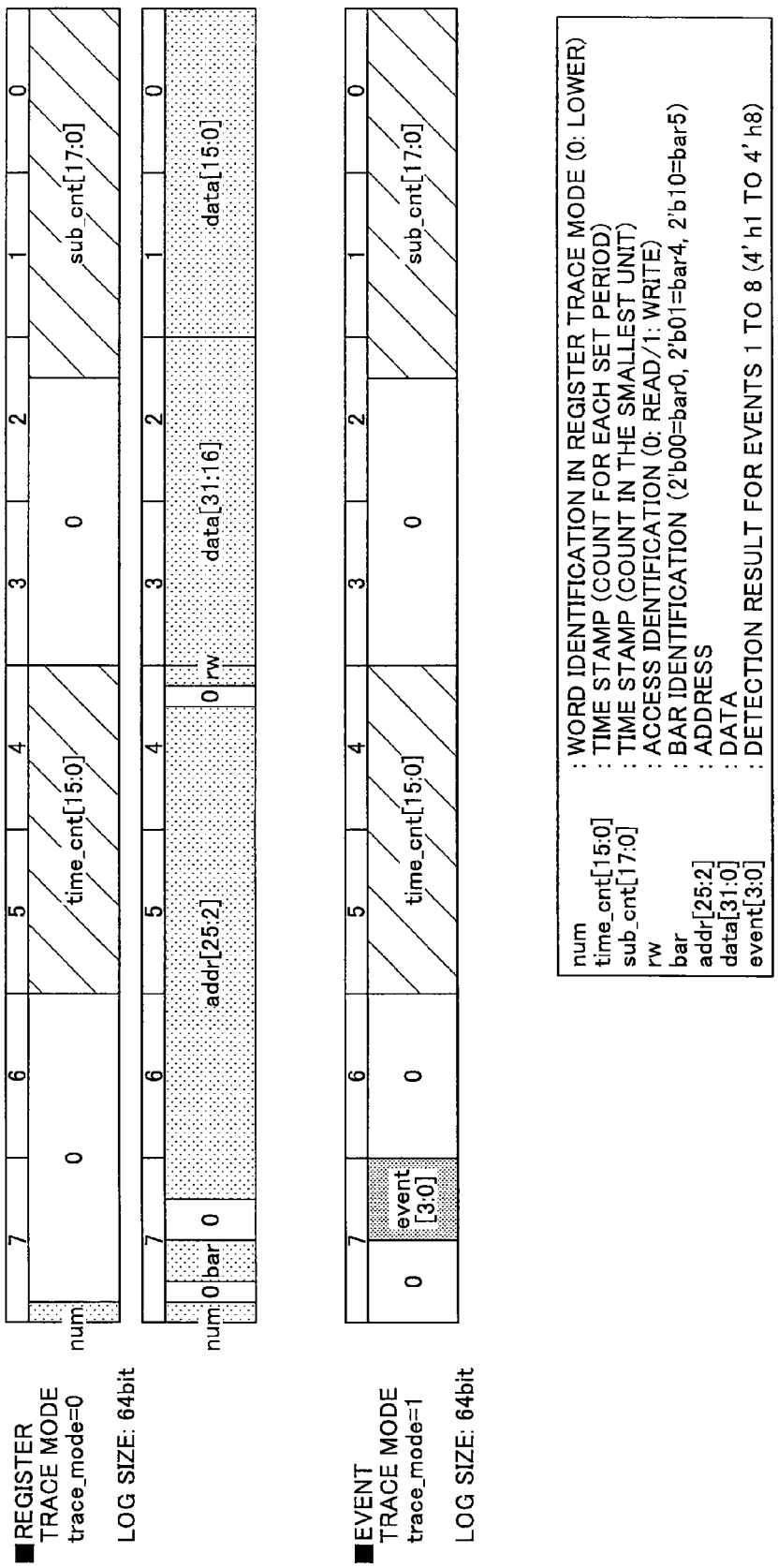
FIG. 3 is a diagram illustrating an example of a log format according to the present embodiment.

The log format conversion unit 9 converts log data of the detected CPU access or the internal signal into a log format as shown in FIG. 3, for example.

The built-in memory access control unit 10 controls an access to the built-in memory unit 11. The built-in memory access control unit 10 generates a selection signal, an R/W signal or an address signal depending on the log data output from the log format conversion unit 9.

The built-in memory unit 11 stores the log data of the detected CPU access which are subjects for log acquisition or of the internal signal 7. The built-in memory unit 11 can be configured, for example, with a SRAM (Static Random Access Memory). In a case where it is before the start-up of the system, an amount of memory for storing log data can be increased by jointing another built-in memory, which is normally used for another purpose, such as image processing.

The log data forwarding unit 12, detects that a burst amount of data to be forwarded to a memory such as the SRAM of the built-in memory unit 11 are accumulated, converts them into a protocol of the AXI bus 19 and performs burst forwarding. However, while an external memory 14 is not available (before initialization of the external memory 14), the data are assumed to be accumulated and remain in the built-in memory 11 temporarily.

The external memory access control unit 13 generates an I/F protocol for the external memory 14. The external memory 14 is a memory provided outside the semiconductor device 27. The external memory 14 can be a volatile memory or a non-volatile memory such as an RAM, a DRAM (Dynamic Random Access Memory), an HDD (Hard Disk Drive) or a flash memory.

The external memory initialization execution unit 15 initializes the external memory 14 without the CPU 1. For example, in a case where the external memory 14 is a DRAM, the external memory initialization execution unit 15 undertakes a series of operations of performing reset control of a PHY/logical layer, setting initialization parameters, setting mode registers, performing training or the like without intervention of the CPU 1.

The external memory initialization completion detection unit 16 detects that initialization execution processing for the external memory 14 by the external memory initialization execution unit 15 is completed without intervention of the CPU 1.

The function module 17 is a module installed in the semiconductor device 27 for executing a variety of functions, and is a logical layer of image processing or DMA, an interrupt controller, an IO (Input/Output) I/F or the like. The function module 17 is accessed by the CPU 1 for executing the functions. The function module 17 is coupled to the internal signal trigger detection unit 8 by an internal signal 7 for acquiring log data.

The serial communication unit 18 can access the same area as the access area of the CPU 1 without intervention of the CPU 1. The serial communication unit 18 is coupled from an external PC (Personal Computer), which is not shown, or the like via a serial command, and can access the external memory 14 via an internal register, an internal memory and the AXI bus 19.

The AXI bus 19 is an example of an internal bus which couples the function module 17, the serial communication unit 18, the external memory access control unit 13 or the like.

The PLL 20 is a PLL (Phase Locked Loop) circuit. The reset generation unit 21 is a reset generation circuit for generating a PLL reset signal 125 used in the semiconductor device 27. An internal clock generation unit 120 is a circuit for generating an internal clock signal 24 used in the semiconductor device 27. An internal reset generation unit 121 is a circuit for generating an internal reset signal 25 used in the semiconductor device 27. At first, reset of the PLL 20 is released, and after output of the internal clock signal 24 becomes stable, reset of the function module 17 or the like inside the semiconductor device 27 is released.

The external reset signal 22 is a reset signal to be input to the reset generation unit 21 from the outside of the semiconductor device 27. An external clock signal 23 is a clock signal to be input to the PLL 20 from the outside of the semiconductor device 27.

The PLL reset signal 125 is a dedicated signal for resetting the PLL 20, output from the reset generation unit 21 and input to the PLL 20. The internal clock signal 24 is a clock signal output from the internal clock generation unit 120. The internal reset signal 25 is a signal which is output from the internal reset generation unit 121 in response to the internal clock signal 24, and resets the function module 17 or the like inside the semiconductor device 27.

A serial communication signal 26 is coupled to the serial communication unit 18. An external memory I/F signal 28 is input to the external memory 14, for example, a DDR SDRAM or the like.

(Flow of Data)

Flows of data (1) to (4), shown in FIG. 1, in the above-described semiconductor device 27 will be briefly explained. The flow (1) is a data flow in which a format conversion is performed by the log format conversion unit 9 for the log data detected by the CPU access detection unit 4 or the internal signal trigger detection unit 8 according to the respective detection conditions set by the detection condition setting unit 6, to generate log formats, and the generated log formats are accumulated in the built-in memory unit 11. The flow (2) is a data flow in which the data are forwarded from the built-in memory unit 11 to the external memory 14. The flow (3) is a data flow in which the serial communication unit 18 accesses the built-in memory unit 11. The flow (4) is a data flow in which the serial communication unit 18 accesses the external memory 14.

The data flow (1) occurs in a case of acquiring log data of the CPU access and in a case of acquiring log data of the internal signal. Accumulation processing for the log data accumulated according to the data flow (1) will be described later with reference to FIG. 5.

<Acquisition of Log of CPU Access>

An access detection condition for determining an access of the subject for log acquisition among accesses from the CPU 1 is set in the detection condition signal 5 in advance, and stored in the detection condition setting unit 6. Through the CPU access I/F signal 3 from the CPU 1, an access to the semiconductor device 27 is performed. The CPU access detection unit 4 detects a CPU access which matches the access detection condition set by the detection condition setting unit 6. A format conversion is performed for log data of the detected CPU access by the log format conversion unit 9. The log data, the format of which is converted, are stored in the built-in memory unit 11 through the built-in memory access control unit 10.

<Acquisition of Log of Internal Signal Trigger>

An event detection condition for determining a signal of the subject for log acquisition among internal signals 7 from the function module 17 is set in the detection condition signal 5 in advance, and stored in the detection condition setting unit 6. The internal signals 7 from the function module 17 are coupled to the internal signal trigger detection unit 8. The internal signal trigger detection unit 8 detects an internal signal 7 which matches the event detection condition set by the detection condition setting unit 6. A format conversion is performed for log data of the detected internal signal 7 by the log format conversion unit 9. The log data, format of which is converted, are stored in the built-in memory unit 11 through the built in memory access control unit 10.

Figure 6:
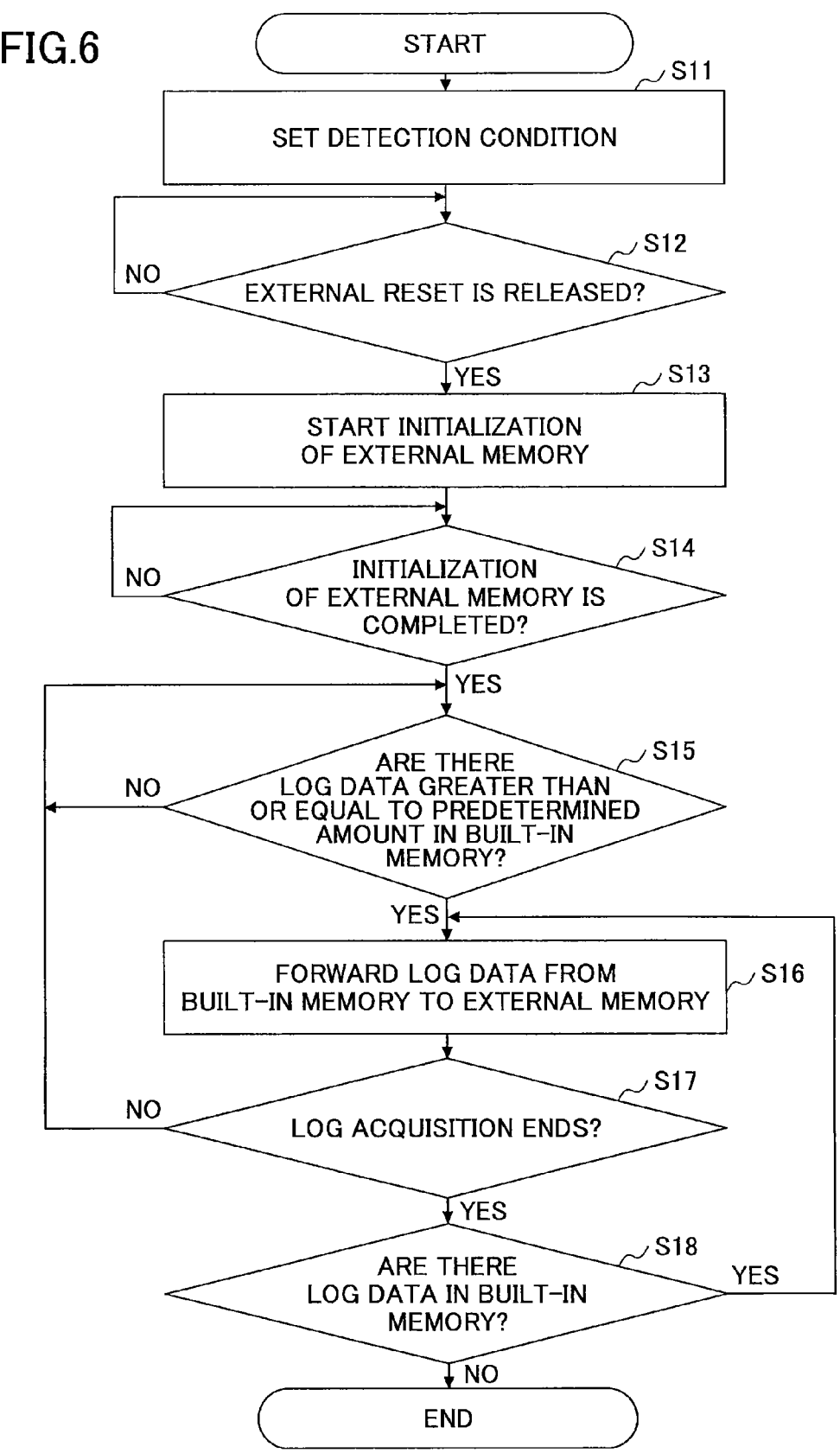
FIG. 6 is a flowchart illustrating an example of a process of forwarding log data to an external memory according to the present embodiment.

Moreover, forwarding processing for the log data forwarded according to the data flow (2) will be described later with reference to FIG. 6. Moreover, initialization processing for the external memory 14 accessed according to the data flow (4) will be described later with reference to FIG. 7.

<Execution of Initialization for External Memory>

Initialization processing for the external memory 14 according to the present embodiment is executed by the external memory initialization execution unit 15 without intervention of the CPU 1. The external memory initialization completion detection unit 16 detects completion of initialization of the external memory 14, and reports to the built-in memory access control unit 10. The built-in memory access control unit 10 starts the log data forwarding unit 12, and forwards log data from the built-in memory unit 11 to the external memory 14 through the external memory access control unit 13.

[Operation from Power-on to Initialization of External Memory]

Figure 2:
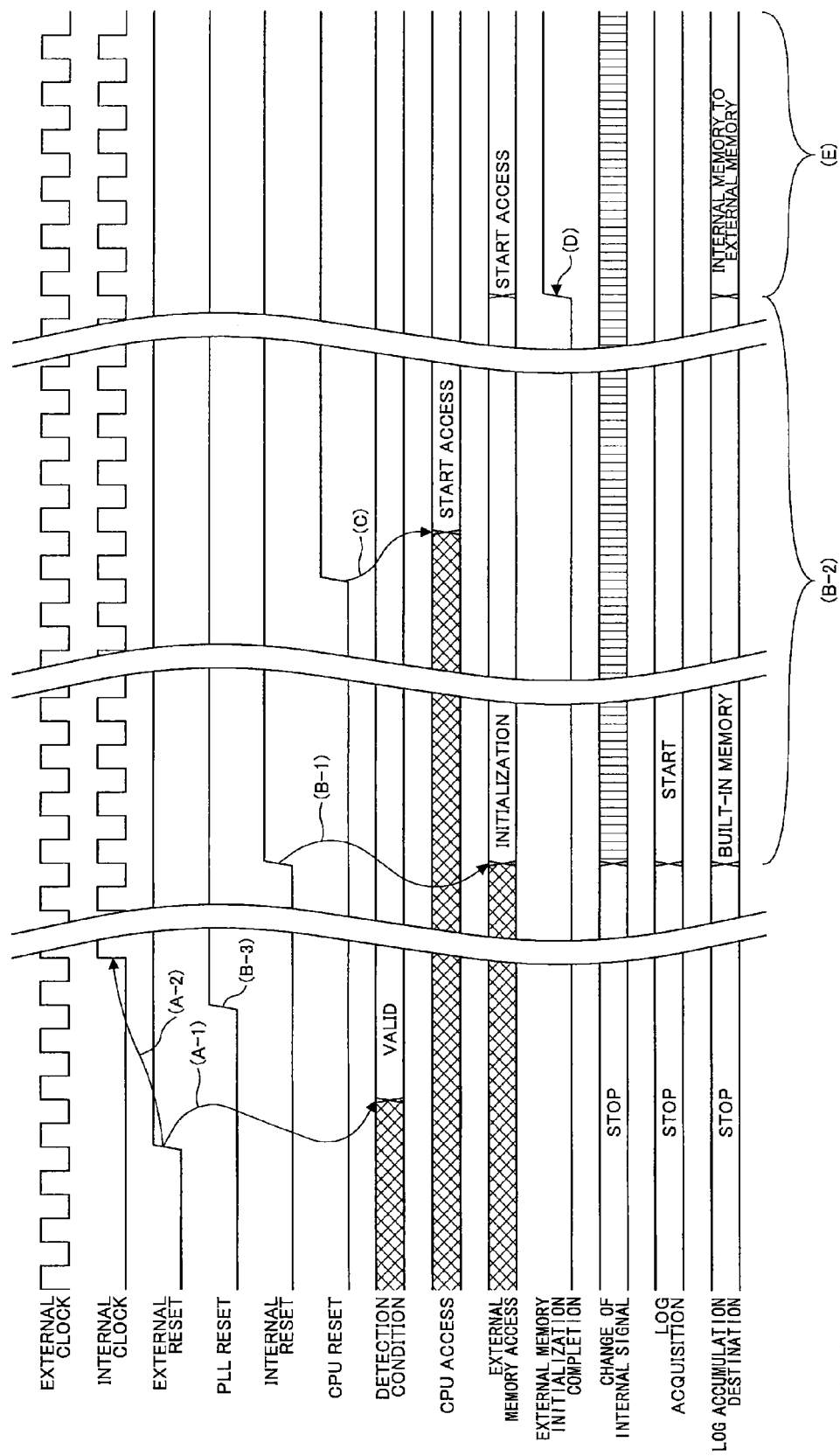
FIG. 2 is a time chart illustrating an example of an operation from a power-on of a system to an initialization of an external memory according to the present embodiment.

Next, an operation from a power-on of the system according to the present embodiment to the initialization of the external memory 14 will be explained with reference to FIG. 2. FIG. 2 is a time chart illustrating an example of the operation from a power-on of the system according to the present embodiment to the initialization of the external memory 14.

In the present embodiment, wording "before start-up of a system" refers to a state before control by the CPU 1 starts or a state where the system itself is not started. That is, "before start-up of a system" means "a state where a reset of the CPU 1 is not released though power of the system including CPU 1 is turned ON" or "a state where although the reset of the CPU 1 is released, the CPU 1 cannot perform the own control". For example, since the operation of the AXI bus to "Link up" can be performed by hardware without intervention of the CPU 1, this operation is regarded as an operation before the CPU 1 starts control. For example, in a case where the system has the above-described configuration, when the "Link up" is not performed, in order to identify a failure in the hardware, the log acquisition method according to the present embodiment is applied, and thereby log data can be detected based on the detection condition set in advance and it becomes possible to perform analysis by using the log data.

Meanwhile, the system according to the present embodiment includes the CPU 1 and the semiconductor device 27. However, the present invention is not limited to this. The system according to the present embodiment is all or a part of the components included in the system electronic apparatus 40, and only has to include at least the CPU 1.

(1) In a case where the external reset signal 22 is released, the PLL reset signal 125, as shown by (B-3) in FIG. 2, is released. In response to this release, the PLL operates and the internal clock signal 24, as shown by (A-2) in FIG. 2, is generated. As shown by (A-1) in FIG. 2, in response to the release of the external reset signal 22, the respective detection conditions set in advance become valid. A timing of releasing the PLL reset signal 125, as shown by (B-3) in FIG. 2, is after the external reset signal 22 and before the internal reset signal 25.

(2) The internal reset signal 25 is released in response to the internal clock signal 24. As shown by (B1) in FIG. 2, in response to the release of the internal reset signal 25, the external memory initialization execution unit 15 starts initialization of the external memory 14.

(3) The release of the reset signal 2 of the CPU 1 may be after the release of the internal reset signal 25. In a case where the reset signal 2 of the CPU 1 is released, the CPU access to the semiconductor device 27 starts, as shown by (C) in FIG. 2.

(4) In a case where the initialization of the external memory 14 is completed, a logic signal indicates the completion of initialization of the external memory changes, as shown by (D) in FIG. 2. The external memory initialization completion detection unit 16 detects the change in the logic signal indicating the completion of initialization of the external signal.

(5) Acquisition of logs becomes possible after the release of the PLL reset signal 125 and the internal reset signal 25 (see (B-2) in FIG. 2).

(6) In a case where the initialization of the external memory 14 is completed, the log data are forwarded from the built-in memory unit 11 to the external memory 14 (See (E) in FIG. 2).

In the present embodiment, it is possible to start the acquisition of log data by hardware before the start of the operation of the CPU 1 in (3), i.e. a start of setting log by the CPU. Moreover, in a case where the external memory 14 becomes available, the log data acquired in the built-in memory unit 11 can be forwarded to the external memory 14.

That is, in the present embodiment, before the CPU 1 starts the operation or in the case where the system does not start, it is possible to acquire log data which matches the access detection condition or the event detection condition set by hardware in advance. The acquired log data can be written into the built-in memory unit 11 of an LSI chip of the external memory 14, which log data are accessible from other than the CPU 1, without intervention of software, and can be used for an analysis.

[Log Format]

Next, an example of the log format according to the present embodiment will be described with reference to FIG. 3. FIG. 3 is a diagram illustrating an example of the log format according to the present embodiment.

(1) Register Trace Mode:

In the upper part of FIG. 3 (register trace mode), an example of a format, in which the log format conversion is performed for a CPU access, is shown.

(2) Event Trace Mode:

In the lower part of FIG. 3 (event trace mode), an example of a format, in which up to eight events are monitored where each event is a combination of operations of internal signals, and log data are generated in a case where each of them occurs, is shown.

To both of (1) and (2), time stamps by a built-in timer are added. The symbol "num" represents word identification in the register trace mode (0: lower and 1: upper). The symbol "time_cnt[15:0]" represents a time stamp (count for each set period). The symbol "sub_cnt[17:0]" represents a time stamp (count for lower 18 bits). The symbol "rw" represents access identification (0: read and 1: write). The symbol "bar" represents bar identification (2'b00=bar0, 2'b01=bar4 and 2'b10=bar5). The symbol "addr[25:2]" represents an address. The symbol "data[31:0]" represents data. The symbol "event[3:0]" represents a detection result for events 1 to 8 (4'h1 to 4'h8), which detects up to eight events simultaneously.

[Detection Condition]

Figure 4:
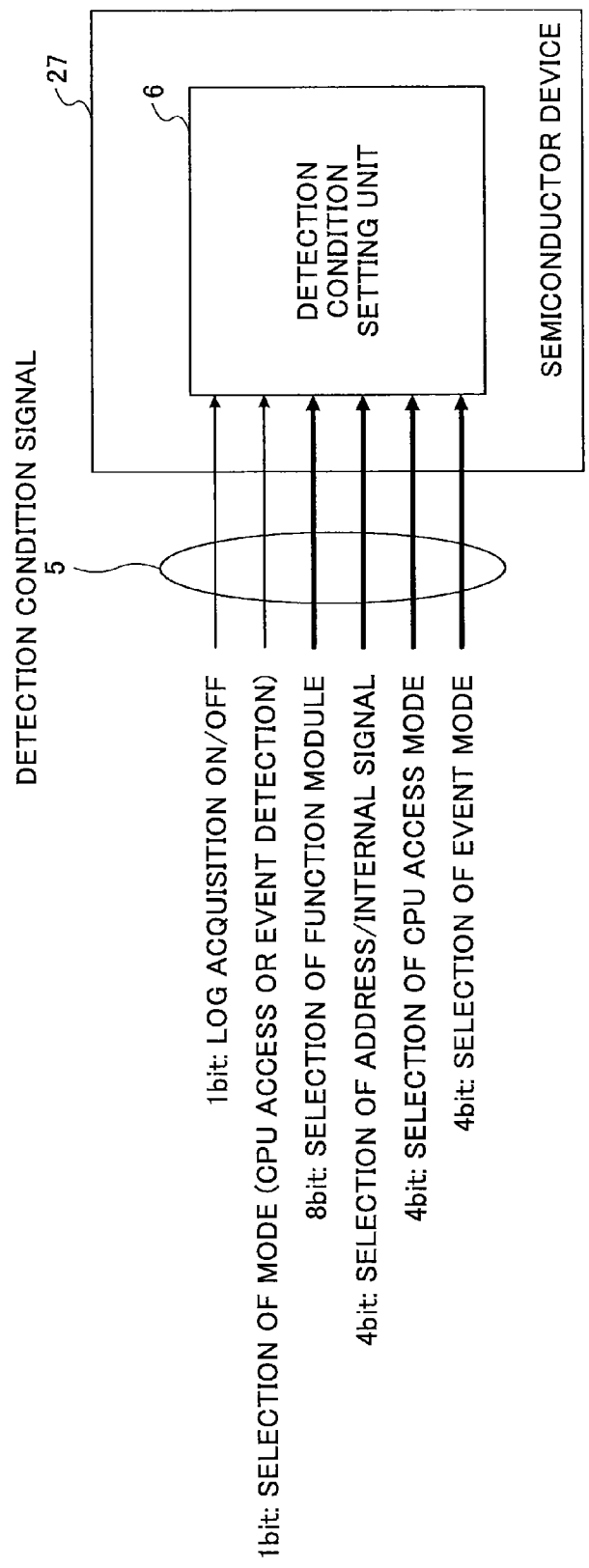
FIG. 4 is a diagram illustrating an example of a detection condition according to the present embodiment.

Next, an example of the access detection condition and the event detection condition which are set in the detection condition setting unit 6 according to the present embodiment will be described with reference to FIG. 4. As the respective detection conditions, on/off of log acquisition, mode selection (the CPU access or the event detection), selection of function module, selection of address/internal signal, selection of CPU access mode, selection of event mode or the like can be set from the terminal outside the semiconductor device 27. These settings can also be changed from the CPU 1 or the serial communication unit 18.

[Processing of Accumulating Log Data to Internal Memory Unit]

Figure 5:
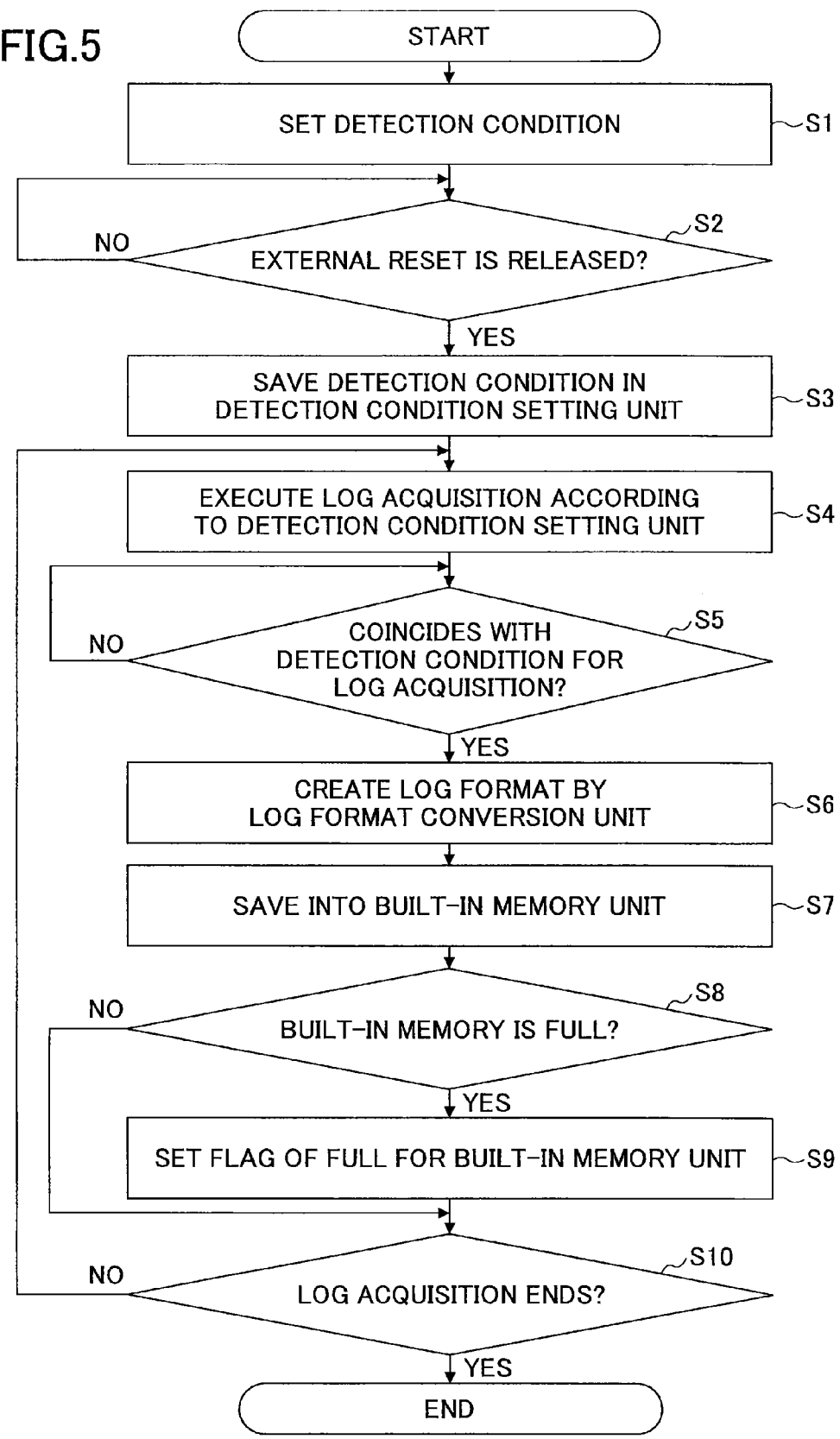
FIG. 5 is a flowchart illustrating an example of a process of accumulating log data into an internal memory according to the present embodiment.

Next, an example of the processing of accumulating log data to the internal memory unit 11 according to the present embodiment will be described with reference to a flowchart in FIG. 5. In a case where the processing of accumulating log data to the internal memory unit 11 according to the present embodiment starts, the detection condition signal 5 is input from the outside of the semiconductor device 27, and thereby the access detection condition or the event detection condition is set (step S1).

Next, the processing waits until the external rest signal 22 is released (step S2). In a case where the external reset signal 22 is released (step S2: YES), the detection condition setting unit 6 stores the detection condition (step S3).

Next, the acquisition of log data starts according to the detection condition setting unit 6 (step S4), and it is determined whether a CPU access or an internal signal, which occurs, matches the log acquisition condition (step S5). Specifically, the CPU access detection unit 4 detects a CPU access, which matches the access detection condition, as log data of subjects for log acquisition, by the CPU access I/F signal 3. The internal signal trigger detection unit 8 detects an event of an internal signal 7, which matches the event detection condition, as log data of subjects for log acquisition.

Next, the log format conversion unit 9 performs a format conversion for the acquired log data and creates a log format (step S6). Next, the built-in memory unit 11 stores the log data after the format conversion as needed through the built-in memory access control unit 10 (step S7).

Next, the built-in memory unit 11 determines whether a storable memory region is full (step S8). In a case where the storable memory region is full (step S8: YES), the built-in memory unit 11 sets flag of full (step S9), and the processing proceeds to step S10. In a case where the storable memory region is not full (step S8: NO), the processing proceeds directly to step S10.

Next, it is determined whether the log acquisition ends (step S10). In a case where the detection condition setting unit 6 sends an instruction to finish the log acquisition (step S10: YES), the processing ends. On the other hand, the detection condition setting unit does not send the instruction to finish the log acquisition (step S10: NO), the processing returns to step S4, and the processes of step S4 and later are repeated.

[Processing of Forwarding Log Data to External Memory]

Next, the processing of forwarding log data to the external memory 14 according to the present embodiment will be described with reference to a flowchart in FIG. 6. In a case where the processing of forwarding log data to the external memory 14 according to the present embodiment starts, the detection condition setting unit 6 sets a detection condition depending on the detection condition signal 5 (step S11). Then, the processing waits until the external reset signal 22 is released (step S12).

Figure 7:
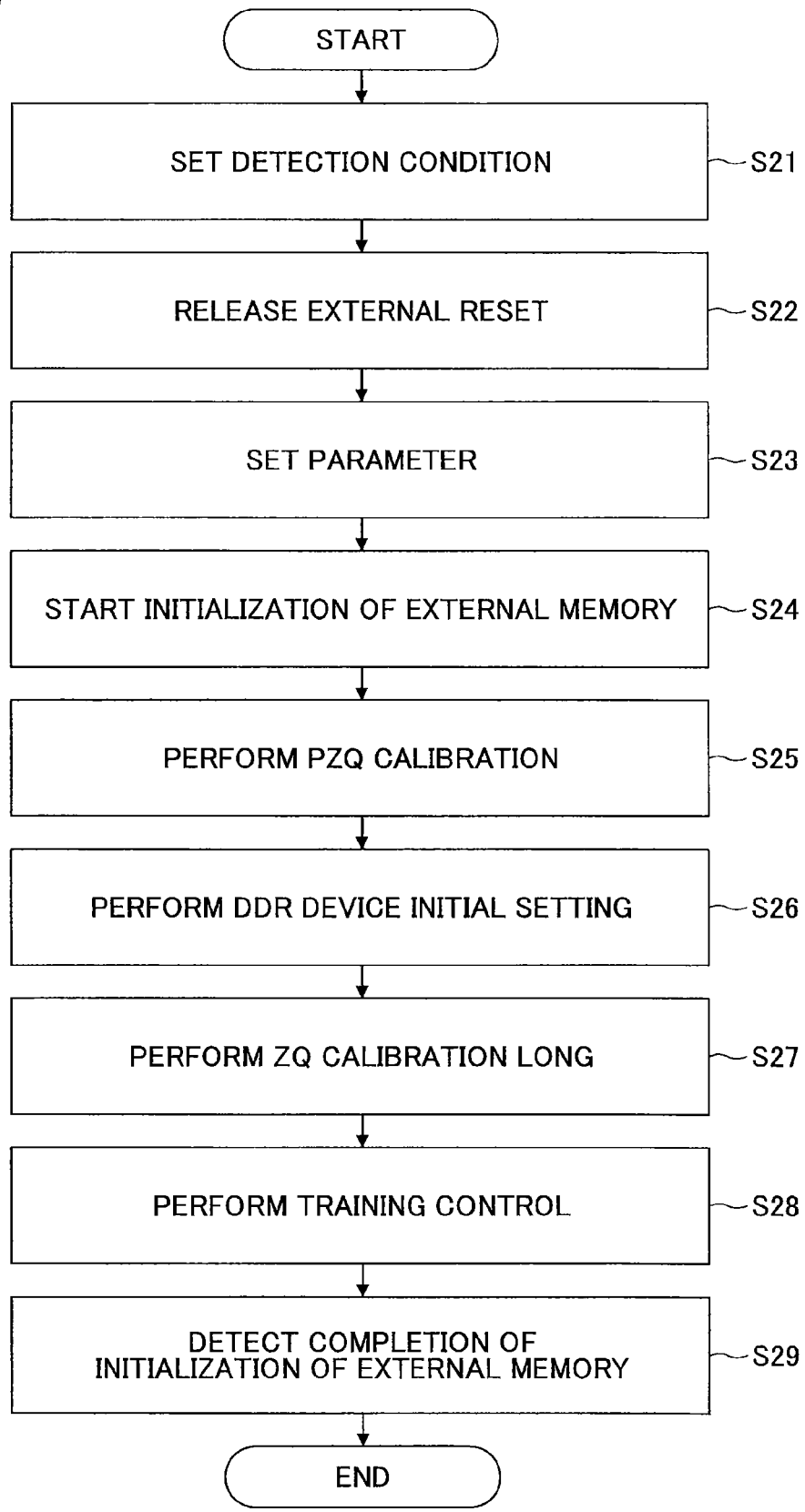
FIG. 7 is a flowchart illustrating an example of initializing the external memory according to the present embodiment.

In a case where the external reset signal 22 is released (step S12: YES), in response to the release of the internal reset signal 25, the external memory initialization execution unit 15 is started (step S13). Therefore, the initialization process for the external memory 14, as shown in FIG. 7, is executed.

Next, the external memory initialization completion detection unit 16 determines whether the initialization process for the external memory 14 is completed (step S14). In a case where the initialization process for the external memory 14 is determined to be completed (step S14: YES), the built-in memory unit 11 determines whether log data greater than or equal to a predetermined amount are accumulated (step S15). The log data greater than or equal to a predetermined amount are, for example, log data of 16 words or more.

Next, in a case where it is determined that log data greater than or equal to a predetermined amount are accumulated in the built-in memory unit 11 (step S15: YES), the log data forwarding unit 12 forwards the log data to the external memory 14 via the built-in memory access control unit 10 and the external memory access control unit 13 (step S16). Next, it is determined whether there is an instruction to finish the log acquisition (step S17). In a case where there is the instruction to finish the log acquisition (step S17: YES), the processing proceeds to step S18. In a case where there is not the instruction to finish the log acquisition (step S17: NO), the processing returns to step S15 and the processes of steps S15 to S17 are repeated. It is determined whether log data remain in the built-in memory unit 11 (step S18). In a case where log data less than the predetermined amount remain in the built-in memory unit 11 (step S18: YES), the remaining log data are transferred to the external memory 14 (step S16). Then, the processing proceeds to steps S17 and S18, and the processing ends.

[Initialization Processing of External Memory]

Next, an example of the initialization processing for the external memory 14 according to the present embodiment will be described with reference to FIG. 7. At first, the respective detection conditions are set by the detection condition setting unit 6 according to an input of the detection condition signal 5, from the outside of the semiconductor device 27 (step S21). Next, the processing waits until the external reset signal 22 is released (step S22). When the external reset signal 22 is released, initial parameters are set in a memory controller and in a register of a DDY-PHY, which is not shown (step S23), after the reset of the external memory access control unit 13 (memory controller). The DDR configuration (volume, bit width, rate or the like) is specified in the detection condition signal 5, and parameter setting values are changed based on the detection condition signal 5.

Next, the external memory initialization execution unit 15 is started and the initialization of the external memory 14 starts (step S24). Then, after the memory controller is started, (in order to enhance the transmission characteristics) PZQ calibration is executed (step S25) to correct an impedance of the transmission path by a hardware operation. Accordingly, variation in a process, temperature or electric voltage of the impedance can be cancelled.

Next, after the PZQ calibration in step S25, an initial setting depending on the DDR device to be used is set in the mode register on the device side (step S26). Then, after the initial setting for the DDR device in step S26, as part of the initialization sequence, (in order to enhance the transmission characteristics) correction for output resistance or terminating resistance is executed in ZQ calibration long (step S27).

Next, (in order to enhance the transmission characteristics) write leveling, gate training and memory training of data eye are serially executed (step S28). Then, in a case where the external memory initialization completion detection unit 16 detects that the initialization of the external memory 14 is completed (step S29), transition to the processing of forwarding log data to the external memory 14, as shown in FIG. 6, becomes possible.

As described above, in the semiconductor device 27 according to the present embodiment, from a status of the external terminal of the semiconductor device 27, the permission or non-permission of log acquisition and the detection condition by the CPU access detection unit 4 or the internal signal trigger detection unit 8 are set in the detection condition setting unit 6. The external memory initialization execution unit 15 executes initialization of the external memory 14 without intervention of the CPU 1. The external memory initialization completion detection unit 16 detects that the initialization of the external memory 14 is completed. In a case where the completion of the initialization of the external memory 14 is detected, the log data forwarding unit 12 forwards log data from the built-in memory unit 11 of the semiconductor device 27 to the external memory 14 through the external memory access control unit 13.

According to the above-described operations, before control by the CPU 1 starts or in a case where the system itself is not started, it is possible to control freely the acquisition range of the log data or the mode. Moreover, before the control for the semiconductor device 27 by the CPU 1 starts or before the system is started, it is possible to detect log data, which are subjects for acquisition, based on the set detection condition, and store them in the built-in memory unit 11 of the semiconductor device 27 without intervention of the CPU 1. Moreover, it is possible to forward the log data stored in the built-in memory unit 11 to the external memory 14 without intervention of the CPU 1 according to the timing at which the initialization of the external memory 14 is completed.

As described above, a semiconductor device, a log acquisition method and an electronic apparatus in which semiconductor device is installed are described in the embodiments. However, the semiconductor device, the log acquisition method and the electronic apparatus according to the present invention are not limited to those of the embodiments, but various variations and modifications may be made without departing from the scope of the present invention. Moreover, items described in the embodiments can be combined to the extent that they do not contradict. Moreover, each function of the semiconductor device may be realized by hardware, by software or by combining hardware and software.

In the technologies disclosed in Japanese Unexamined Patent Application Publications Nos. 2013-225291 and 2008-287319, it is difficult to control an acquisition range or an acquisition condition for log data before starting controlling the semiconductor device by the CPU or before a system of the semiconductor device starts, and it is difficult to write the acquired log data into an external memory such as a DDR (Double-Data-Rate) SDRAM.

According to an aspect of the embodiment, it is possible to store log data detected based on a detection condition into a memory before starting controlling a semiconductor device by a CPU or before a system of the semiconductor device starts.

What is claimed is:

1. A semiconductor device comprising:
   a CPU (central processing unit) access detection unit configured to detect a predetermined access among accesses from a CPU to the semiconductor device, based on an access detection condition, the predetermined access being a subject for log acquisition;
   an internal signal detection unit configured to detect a predetermined internal signal among internal signals from a function module in the semiconductor device, based on an event detection condition, the predetermined internal signal being a subject for the log acquisition;
   an internal memory unit configured to store at least one of log data for the predetermined access detected by the CPU access detection unit and log data for the predetermined internal signal detected by the internal signal detection unit;
   a setting input unit configured to receive an input of setting data; and
   a detection condition setting unit configured to set the access detection condition or the event detection condition based on the setting data.

2. The semiconductor device according to claim 1 further comprising an internal memory access control unit configured to control an access to the internal memory unit,
   wherein the detection condition setting unit is configured to determine whether to permit acquiring the log data based on the setting data, and
   wherein the internal memory access control unit is configured to control the access to the internal memory unit according to whether to permit acquiring the log data.

3. The semiconductor device according to claim 1,
   wherein the internal memory unit is configured to store the log data before control of the CPU starts or before a system in which the semiconductor device is installed is started.

4. The semiconductor device according to claim 1 further comprising an external memory access control unit configured to control an access to an external memory to which the log data stored in the internal memory unit are forwarded, the external memory being arranged outside the semiconductor device.

5. The semiconductor device according to claim 4 further comprising:
   an external memory initialization execution unit configured to initialize the external memory;
   an initialization completion detection unit configured to detect completion of initialization of the external memory; and
   a log data forwarding unit configured to forward the log data stored in the internal memory unit to the external memory via the external memory access control unit in a case where the initialization completion detection unit detects the completion of the initialization of the external memory.

6. The semiconductor device according to claim 5 further comprising a serial communication unit configured to enable an access to the internal memory unit and to the external memory from outside the semiconductor device without intervention of the CPU.

7. The semiconductor device according to claim 1,
   wherein the detection condition setting unit is configured to set at least one of the access detection condition and the event detection condition before a reset of the CPU is released.

8. The semiconductor device according to claim 7,
   wherein the detection condition setting unit is configured to set at least one of the access detection condition and the event detection condition in response to a release of a reset to an outside of the semiconductor device.

9. A log acquisition method for acquiring log data of a semiconductor device including an internal memory unit comprising:
   detecting a predetermined access among accesses from a CPU to the semiconductor device, based on an access detection condition, the predetermined access being a subject for log acquisition;
   detecting a predetermined internal signal among internal signals from a function module in the semiconductor device, based on an event detection condition, the predetermined internal signal being a subject for the log acquisition;
   receiving an input of setting data;
   setting the access detection condition or the event detection condition, based on the setting data;
   determining whether to permit the log acquisition based on the setting data; and
   storing at least one of log data for the predetermined access and log data for the predetermined internal signal in the internal memory unit, an access to the internal memory unit being controlled according to whether the log acquisition is permitted.

10. An electronic apparatus comprising:
    the semiconductor device according to claim 1; and
    an external memory to which log data stored in the internal memory unit are forwarded.

* * * * *